United States Patent
Yamanaka et al.

(10) Patent No.: US 6,469,243 B2
(45) Date of Patent: Oct. 22, 2002

(54) DYE-SENSITIZING SOLAR CELL, METHOD FOR MANUFACTURING DYE-SENSITIZING SOLAR CELL AND SOLAR CELL MODULE

(75) Inventors: Ryosuke Yamanaka, Gojo; Liyuan Han, Kitakatsuragi-gun, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/748,232

(22) Filed: Dec. 27, 2000

(65) Prior Publication Data
US 2001/0004901 A1 Jun. 28, 2001

(30) Foreign Application Priority Data
Dec. 27, 1999 (JP) ............................................ 11-370407

(51) Int. Cl.$^7$ ............................................... H01L 31/04
(52) U.S. Cl. ....................... 136/263; 136/244; 136/251; 136/256; 429/111; 438/80; 438/98; 438/85; 438/64; 438/66
(58) Field of Search ................................. 136/263, 244, 136/251, 256; 429/111; 438/80, 98, 85, 64, 66

(56) References Cited

U.S. PATENT DOCUMENTS

| | | | |
|---|---|---|---|
| 2,011,557 A | | 8/1935 | Anderegg |
| 5,441,827 A | * | 8/1995 | Gratzel et al. ............... 429/111 |
| 6,043,428 A | * | 3/2000 | Han et al. .................... 136/263 |
| 6,150,605 A | * | 11/2000 | Han ............................ 136/263 |
| 6,153,824 A | * | 11/2000 | Takada et al. ............... 136/263 |
| 6,291,036 B1 | | 9/2001 | Wang et al. |

FOREIGN PATENT DOCUMENTS

| | | |
|---|---|---|
| JP | 7-249790 A | 9/1995 |
| JP | 2664194 B2 | 6/1997 |
| JP | 10-331532 A | 12/1998 |
| WO | 91/16719 | 10/1991 |
| WO | WO 97/16838 A1 * | 5/1997 |

* cited by examiner

Primary Examiner—Alan Diamond
(74) Attorney, Agent, or Firm—Nixon & Vanderhye P.C.

(57) ABSTRACT

A dye-sensitizing solar cell comprising: a first substrate whose surface is at least conductive; a second substrate on which a conductive layer is formed, the second substrate being transparent, the first and second substrates being spaced by a distance with the conductive surfaces of the first and second substrates opposite to each other; a semiconductor layer having a dye adsorbed thereon, the semiconductor layer being formed on one of the conductive surfaces; a glass frit for sealing peripheral edges of the first and second substrates; and a redox electrolyte which is filled between the first and second substrates.

20 Claims, 13 Drawing Sheets

DYE-SENSITIZING SOLAR CELL, METHOD FOR MANUFACTURING DYE-SENSITIZING SOLAR CELL AND SOLAR CELL MODULE

CROSS-REFERENCE TO RELATED APPLICATION

This application is related to Japanese application No. HEI 11-370407 filed on Dec. 27, 1999, whose priority is clamed under 35 USC §119, the disclosure of which is incorporated by reference in its entirety.

BACKGROUND OF THE INVENTION

1. Field of the Invention

The present invention relates to a dye-sensitizing solar cell, a method for manufacturing a dye-sensitizing solar cell, and a solar cell module.

2. Description of the Related Art

A solar cell of a silocon semiconductor using p-n junction or a solar cell including a semiconductor layer made of a metallic oxide such as a titanium oxide with a photosensitizing dye adsorbed on the layer has been so far generally known.

Such a solar cell having the adsorbed photosensitizing dye is generally called a dye-sensitizing solar cell.

Among solar cells, the dye-sensitizing solar cell has attracted much interest because of high conversion efficiency.

In a conventional structure of the dye-sensitizing solar cell, it is generally known that the structure is composed of a transparent substrate such as a glass, a transparent conductive film of $SnO_2$ formed on the transparent substrate, a semiconductor layer of a titanium oxide formed on the conductive film, a conductive substrate opposing to the transparent substrate in spaced-apart relationship, a resin such as an epoxy resin for sealing peripheral edges of the transparent substrate and the conductive substrate to form a closed space between the substrates, and a redox electrolyte filled into the closed space.

When light is applied to the semiconductor layer of the dye-sensitizing solar cell, electrons are generated in the semiconductor layer, taken out in an external electric circuit to work and then transferred to the conductive substrate. The electrons transferred to the conductive substrate are further transferred to the electrolyte as ions, and returned to the semiconductor layer.

This is repeated to obtain electric energy from the dye-sensitizing solar cell.

In the dye-sensitizing solar cell having the conventional structure, the redox electrolyte is sealed with the resin.

When the solar cell is actually used outdoors, the surface temperature exceeds 80° C. to expand the electrolyte therein.

Further, in consideration of the factor that the solar cell is exposed to the outdoor weather for a long period of time, the solar cell made by a method in which the redox electrolyte is sealed with the resin is problematic in durability. That is, when the epoxy resin is broken by weathering, the redox electrolyte is leaked. Thus, further improvement has been in demand for increasing durability and safety of the dye-sensitizing solar cell.

SUMMARY OF THE INVENTION

Under these circumstances, the invention is to provide a dye-sensitizing solar cell excellent in durability and safety in which the redox electrolyte is sealed with a vitreous material excellent in durability and chemical resistance, and a method for manufacturing the dye-sensitizing solar cell.

In accordance with the present invention, there is provided a dye-sensitizing solar cell comprising: a first substrate whose surface is at least conductive; a second substrate on which a conductive layer is formed, the second substrate being transparent, the first and second substrates being spaced by a distance with the conductive surfaces of the first and second substrates opposite to each other; a semiconductor layer having a dye adsorbed thereon, the semiconductor layer being formed on one of the conductive surfaces; a glass frit for sealing peripheral edges of the first and second substrates; and a redox electrolyte which is filled between the first and second substrates.

Also, in accordance with the present invention, there is provided a method for manufacturing a dye-sensitizing solar cell, comprising the step of: forming a semiconductor layer on a first or second substrate, a step of opposing; the first and second substrates to each other in spaced-apart relationship; sealing edges of the first and second substrates with a glass frit to form a closed space between the first and second substrates; forming openings for communicating the closed space with the outside in at least two positions; circulating a dye solution within the closed space through the openings so that the dye is adsorbed on the semiconductor layer; and discharging the remaining dye solution and then injecting a redox electrolyte into the closed space.

Also, in accordance with the present invention, there is provided a solar cell module comprising a plurality of dye-sensitizing solar cells are arrayed in a plane and electrically connected with metal wires, each of the dye-sensitizing solar cells being defined in the invention.

BRIEF DESCRIPTION OF THE DRAWINGS

The invention will be more specifically described with reference to the accompanying drawings, in which.

DETAILED DESCRIPTION OF THE INVENTION

Figure 1:
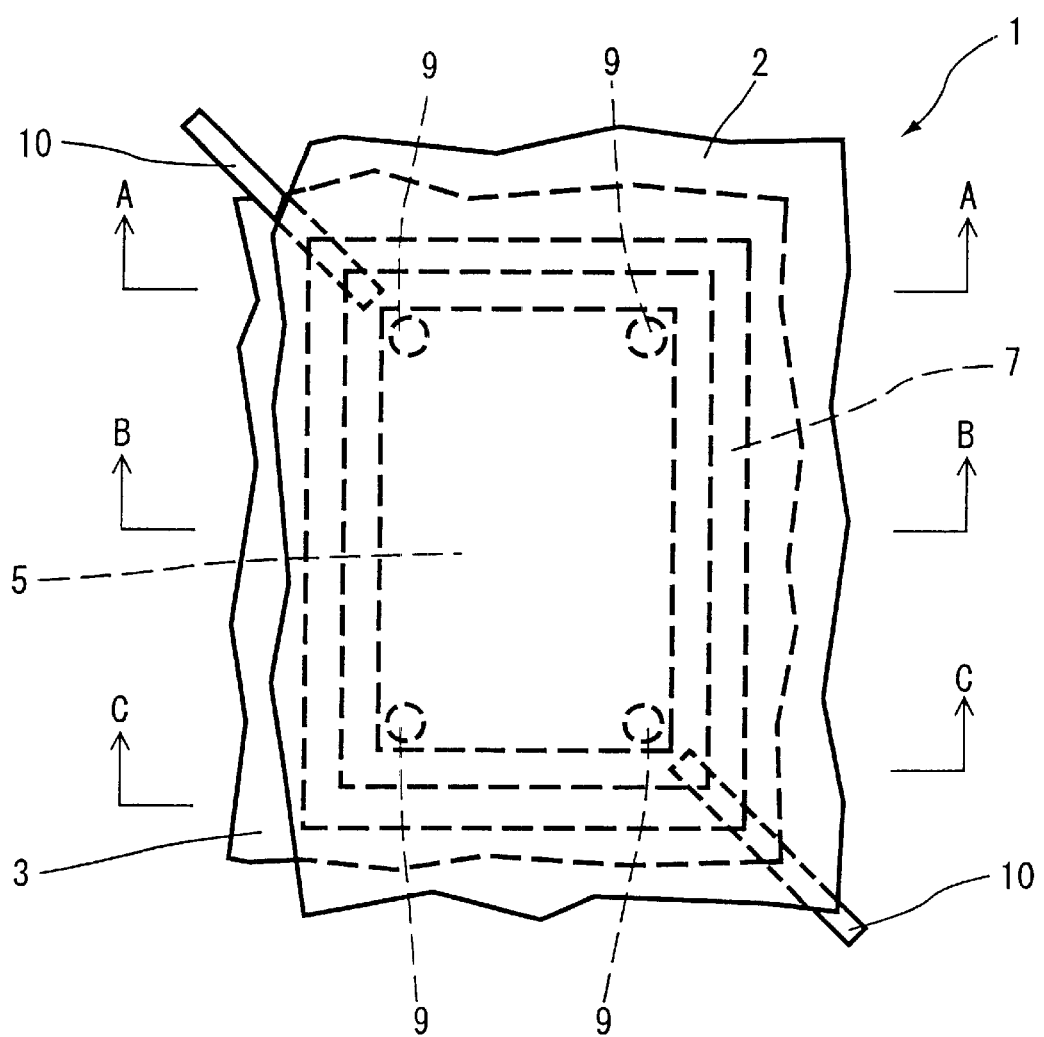
FIG. 1 is a plan view showing a dye-sensitizing solar cell of the invention in Example 1.

In the dye-sensitizing solar cell of the invention, a substrate having conductivity, heat resistance and chemical resistance can be used as the first substrate. Further, the first substrate may be a light-transmitting or non-light-transmitting substrate. Thus, a material of the first substrate is not particularly limited.

For example, a substrate which is made of a conductive material, such as an aluminium or copper, can be used as the first substrate. Also, a transparent substrate which is made of a glass or light-transmitting plastic and whose surface has transparent conductive film, such as a ITO or $SnO_2$, can be used.

The second substrate requires a light transmission and conductivity. Accordingly, for example, the transparent substrate which is made of the glass or light-transmitting plastic and whose surface has the transparent conductive film can preferably be used as the second substrate.

Further, in the dye-sensitizing solar cell of the invention, it is preferable that the semiconductor layer has a width of approximately 3 to 20 mm so that a series resistance does not influence a performance when the dye-sensitizing solar cell module is constructed, as will be described later.

Since the width of the semiconductor layer and the series resistance are proportionally changed, an appropriate width has to be selected according to the type of each semiconductor layer. For example, when the width of the semiconductor layer formed of titanium oxide exceeds 20 mm, the series resistance of a dye-sensitizing solar cell module becomes higher than 40 Ω. Thus, the width of the semiconductor layer is preferably less than approximately 20 mm.

In order to oppose the first and second substrates in predetermined spaced-apart relationship in the method for manufacturing the dye-sensitizing solar cell of the invention, it is possible that glass beads each having a diameter of approximately 2 to 20 μm are interposed between the first and second substrates.

For example, three glass beads can be interposed in appropriate positions of peripheral edges of the first and second substrates, or four glass beads can be interposed in four corners of the first and second substrates.

The diameter of the glass bead is set at approximately 2 to 20 μm because when the space between the first and second substrates is too small the redox electrolyte is hardly permeated, and when it is too large the volume of the redox electrolyte is increased to increase electrical resistance.

In the method for manufacturing the dye-sensitizing solar cell in the invention, the step of forming the openings for communicating the closed space with the outside may be performed by forming openings in one of the first and second substrates.

The step of forming the openings for communicating the closed space with the outside may be performed by inserting tubular members into the closed space through a pasty glass frit.

As specific tubular members, glass tubes can be used.

It is preferable to form the openings in at least two positions.

This is because when the openings are formed in at least two positions, one of the openings is used for injecting a gas or a liquid and the other for discharging the same so that the injection and the discharge of the gas or liquid can be conducted at good efficiency.

For example, when the dye-sensitizing solar cell has a rectangular shape, forming the two openings in diagonal line of the dye-sensitizing solar cell is convenient because retention of the gas or liquid is obviated.

When openings are formed in four positions, various methods can be considered. For example, the gas or liquid is injected from three openings, and discharged from one opening.

The dye solution in the method for manufacturing the dye-sensitizing solar cell in the invention is a solution obtained by dissolving a photosensitizing dye acting as a photosensitizer in a solvent.

The photosensitizing dye has absorptions in various visible light regions and an infrared light region. In order that the semiconductor firmly adsorb the photosensitizing dye, the dye having an interlock group such as a carboxyl group, an alkoxy group, a hydroxy group, a hydroxyalkyl group, a sulfonic group, an ester group, a mercapto group or a phosphonyl group in a dye molecule is preferable. The interlock group provides electrical bond that facilitates transfer of electrons between a dye in an excited state and a conduction band of a semiconductor. Examples thereof include a ruthenium bipyridine dye, an azo dye, a quinone dye, a quinoneimine dye, a quinacridone dye, a squalilium dye, a cyanine dye, a merocyanine dye, a triphenylmethane dye, a xanthene dye, a porphyrin dye, a phthalocyanine dye, a perylene dye, an indigo dye and a naphthalocyanine dye.

Specific examples of the solvent in which the photosensitizing dye is dissolved can include known solvents, for example, alcohols such as ethanol, ketones such as acetone, ethers such as diethyl ether and nitrogen compounds such as acetonitrile. These can be used either singly or in combination.

The concentration of the photosensitizing dye in the dye solution is adjusted, as required, depending on the type of the photosensitizing dye and the type of the solvent. For example, it is adjusted to, approximately $1 \times 10^{-5}$ mol/liter or more, preferably $5 \times 10^{-5}$ to $1 \times 10^{-2}$ mol/liter.

The dye solution can be circulated in the closed space by, for example, a method in which the dye solution is circulated forcibly by connecting a pump for injecting the dye solution with the opening via a hose (an injection amount of the pump and a circulation time will be described in detail later in Examples).

The circulation of the dye solution in the closed space is preferable because of a high adsorption efficiency of the photosensitizing dye to the semiconductor layer. Alternatively, the photosensitizing dye can be adsorbed on the semiconductor layer only by dipping the semiconductor layer in the dye solution at atmospheric pressure for approximately 5 minutes to 96 hours.

The redox electrolyte injected into the closed space is not particularly limited so long as it is a redox electrolyte generally used in cells or solar cells.

As the redox electrolyte, for example, a solution obtained by dissolving approximately 0.3 mol/liter of lithium iodide and approximately 0.03 mol/liter of iodine in an acetonitrile solvent can be proposed.

In the method for manufacturing the dye-sensitizing solar cell in the invention, the step of forming the semiconductor layer comprises coating a suspension containing semiconductor particles on a surface of the first or second substrate and calcining and curing the coated suspension, the step of sealing the peripheral edges of the first and second substrates comprises coating the pasty glass frit containing a binder on the peripheral edges of the first and second substrates, temporally calcining the pasty glass frit to remove the binder and then substantially calcining the glass frit to be cured, wherein the steps of calcining the suspension and substantially calcining the glass frit are conducted simultaneously.

In the method for manufacturing the dye-sensitizing solar cell in the invention, the suspension is a solution of semiconductor particles in a solvent.

The semiconductor particles are not particularly limited, and semiconductor particles generally used in photoelectric conversion materials can be used. For example, one or more types selected from known semiconductor particles of titanium oxide, zinc oxide, tungsten oxide, barium titanate, strontium titanate and cadmium sulfide are available.

Of these, titanium oxide particles are preferable in view of stability and safety. Titanium oxide which can be used in the invention includes various titanium oxides such as anatase titanium oxide, rutile titanium oxide, amorphous titanium oxide, metatitanic acid and orthotitanic acid, titanium hydroxide and titanium oxide compounds.

Examples of the solvent can include glyme-based solvents such as ethylene glycol monomethyl ether, alcohol-based solvents such as isopropyl alcohol, an alcohol-based mixed solvent such as a mixture of isopropyl alcohol and toluene, and water.

In order to improve the photoelectric conversion efficiency of the semiconductor layer of the dye-sensitizing solar cell, it is required to adsorb the photosensitizing dye described above (hereinafter referred to as a "dye") on the semiconductor layer.

To this end, it is preferable that the specific surface area of the semiconductor layer is as large as 10 $m^2/g$ to 200 $m^2/g$.

Accordingly, as the semiconductor particles contained in the suspension, for example, particles of a single or compound semiconductor having an average particle diameter of 1 nm to 2,000 nm are preferable.

When the suspension is coated on the substrate, the thickness of the suspension coated on the substrate is preferably between 0.1 and 50 $\mu$m.

The coated suspension may be predried, before calcination, by heating at approximately 100° C. for approximately 30 minutes.

In the method for manufacturing the dye-sensitizing solar cell in the invention, the pasty glass frit coated on the peripheral edges of the first and second substrates may be a mixture of a glass powder and an acrylic resin as a binder.

Specific examples of the glass powder may be made of ceramics; PbO, $B_2O_3$, $Na_2O$, BaO, $SiO_2$ or a mixture thereof; or crystalline glass powders.

In order to cure the pasty glass frit, the temporal calcination and the substantial calcination are required.

The step of temporally calcining the glass frit may be conducted under a temperature profile in which the temperature is raised to a first temperature with a first temperature gradient and raised from the first temperature to a second temperature with a second temperature gradient easier than the first temperature gradient, and the second temperature is maintained for a predetermined period of time and then lowered with a third temperature gradient.

For example, it is possible that in the first temperature gradient, the temperature is raised at a rate of approximately 7 to 10° C./min and the first temperature is approximately 320° C.; in the second temperature gradient, the temperature is raised at a rate of approximately 4° C./min, the second temperature is approximately 380° C. and a fixed time for maintaining the second temperature is approximately 10 minutes; and in the third temperature gradient, the temperature is lowered at a rate of approximately 5 to 100° C./min.

This is because when an acrylic resin is used as the binder, the decomposition and combustion temperature thereof is within the range of approximately 320 to 380° C.

By the way, the temporal calcination has to be conducted in air or in oxygen to remove the resin as the binder.

In the method for manufacturing the dye-sensitizing solar cell in the invention, the step of calcining the suspension and the glass frit simultaneously may be conducted under a temperature profile in which the temperature is raised to a third temperature with a fourth temperature gradient and the third temperature is maintained for a fixed period of time and then lowered with a fifth temperature gradient.

Specifically, for example, in the fourth temperature gradient, the temperature is raised at a rate of approximately 50° C./min, the third temperature is approximately 460° C., a fixed time for maintaining the third temperature is approximately 40 minutes, and in the fifth temperature gradient, the temperature is lowered at a rate of approximately 20° C./min.

When the suspension contains titanium oxide particles, the calcination may be conducted while feeding oxygen to the closed space via the openings.

A thickness of the semiconductor layer formed in this manner is not particularly limited, and it is, for example, between 0.1 to 50 $\mu$m.

Further, in the invention, the semiconductor layer may be formed by methods other than the above-mentioned, for example, various known methods such as a CVD or MOCVD method using a predetermined starting gas, and a PVD, deposition, sputtering or sol-gel method using a starting solid.

The suspension and the pasty glass frit may be calcined separately.

When the suspension alone is calcined, it is advisable that the conditions are adjusted, as required, depending on the types of the substrate and the semiconductor particles used. For example, the calcination can be conducted by heating the coated suspension in air or in an atmosphere of an inert gas at approximately 50 to 800° C. for approximately 10 seconds to 12 hours.

This calcination may be conducted only once at a fixed temperature or twice at different temperatures.

When only the substantial calcination of the glass frit after the temporal calcination is conducted, it is advisable to use the temperature profile that the temperature is raised to approximately 410 to 460° C. at a rate of approximately 50° C./min, the peak temperature of approximately 410 to 460° C. is maintained for approximately 10 to 40 minutes, and the temperature is then lowered at a rate of approximately 20° C./min (as described in a brochure "Glass for Electric Parts", Nippon Electric Glass Co., Ltd.).

The predrying of the suspension, the temporal calcination of the glass frit and the calcination of the suspension and the glass frit that require the heating can be conducted in an electric oven.

In the dye-sensitizing solar cell of the invention, a dye-sensitizing solar cell module in which plural dye-sensitizing solar cells are arrayed in a plane and electrically connected with a metal wire can be provided.

The material of the metal wire is preferably a material having as low a resistance as possible to reduce power loss of the module. Examples thereof can include copper, aluminum and silver.

EXAMPLES

The invention is illustrated specifically by referring to the following Examples shown in drawings. However, the invention is not limited thereto.

Example 1

Example 1 of the invention is described on the basis of FIGS. 1 to 8.

Figure 2:
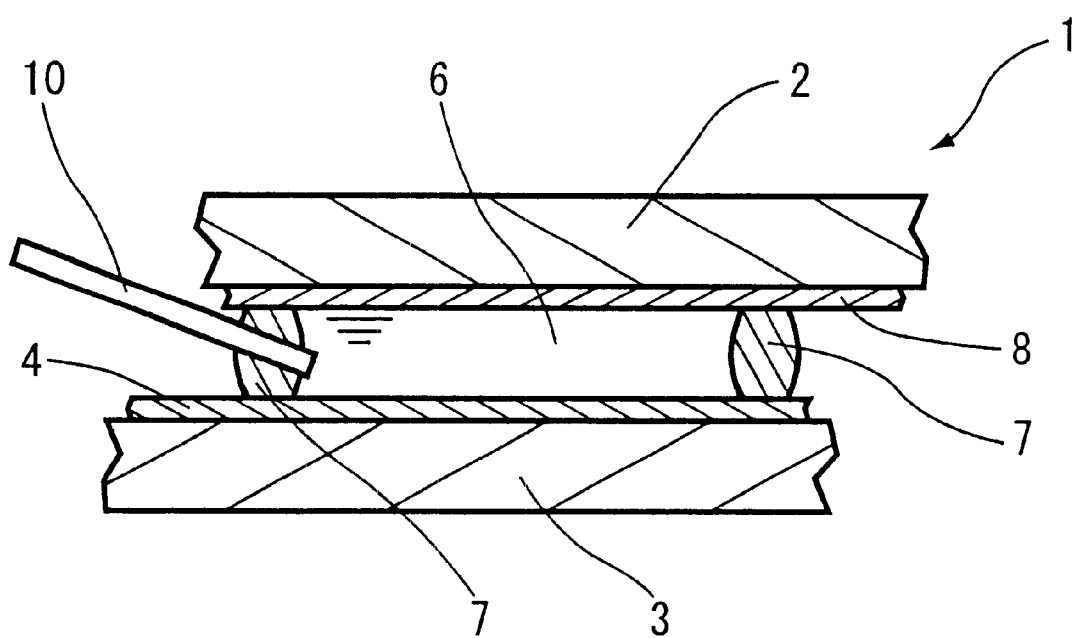
FIG. 2 is a sectional view taken along line A—A of FIG. 1.
Figure 3:
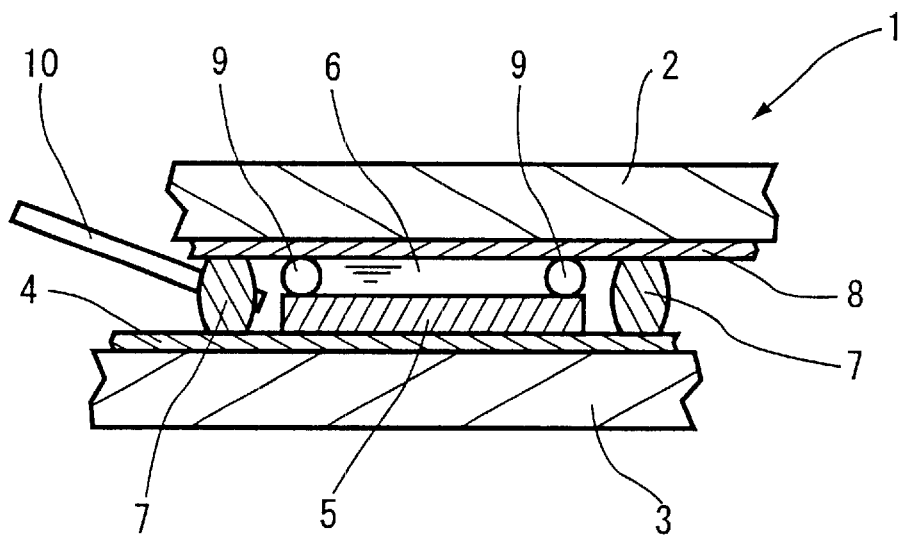
FIG. 3 is a sectional view taken along line B—B of FIG. 1.
Figure 4:
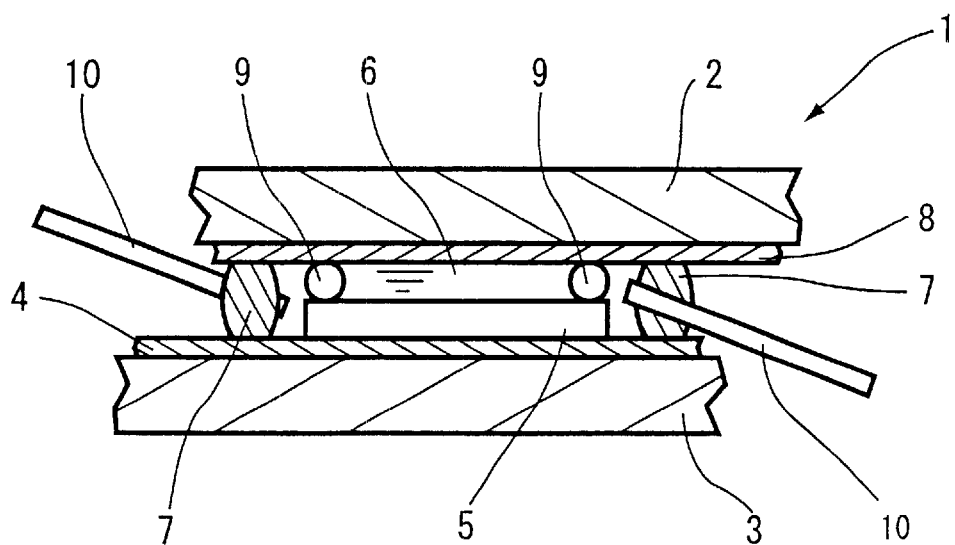
FIG. 4 is a sectional view taken along line C—C of FIG. 1.

Incidentally, FIG. 1 is a plan view showing a dye-sensitizing solar cell in Example 1, FIG. 2 is a sectional view taken along line A—A of the dye-sensitizing solar cell of FIG. 1, FIG. 3 is a sectional view taken along line B—B of FIG. 1, and FIG. 4 is a sectional view taken along line C—C of FIG. 1.

In the dye-sensitizing solar cell 1, as shown in FIGS. 1 to 4, a conductive substrate (first substrate) 2 and a transparent glass substrate (second substrate) 3 on which a conductive film 4 is formed are arranged in predetermined spaced-apart relationship so that the conductive surfaces are opposite to each other, a semiconductor layer 5 having a adsorbed dye is formed on the opposite surface of the glass substrate 3, a redox electrolyte 6 is filled between the conductive substrate 2 and the glass substrate 3, and peripheral edges of the conductive substrate 2 and the glass substrate 3 are sealed with a glass frit 7.

A platinum film 8 that expedites supply of electrons to the redox electrolyte 6 is formed on the opposite surface of the conductive substrate 2. In this case, the platinum film is used. A carbon film is also available. Further, a glass bead 9 and a glass tube 10 will be described in detail in an item of a method for manufacturing the dye-sensitizing solar cell in this Example.

Figure 5A:
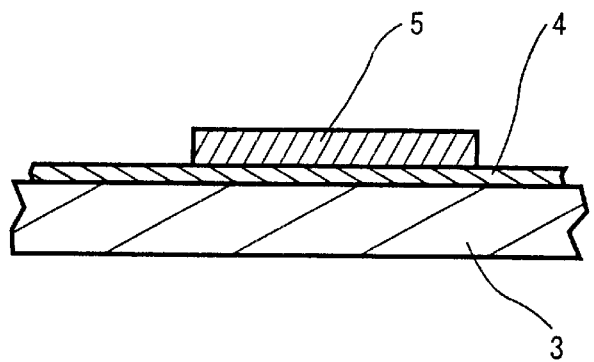
FIGS. 5a to 5c are flow charts describing a method for manufacturing the dye-sensitizing solar cell shown in FIGS. 1 to 4.

In a method for manufacturing the dye-sensitizing solar cell 1 shown in FIGS. 1 to 4, first, the semiconductor layer 5 is formed on the conductive film 4 of the glass substrate 3 as shown in FIG. 5a. The conductive film 4 is made of $SnO_2$, and it is transparent. The conductive film 4 is formed on the opposite surface alone of the glass substrate 3.

The semiconductor layer 5 is formed by coating a titanium oxide suspension to a thickness of approximately 10 $\mu$m with a size of approximately 10×30 mm using a doctor blade to form a suspension-coated layer, preheating the layer at approximately 100° C. for 30 minutes, and then calcining the layer in the presence of oxygen at approximately 460° C. for 40 minutes.

The titanium oxide suspension is prepared by dispersing 4.0 g of commercial titanium oxide particles (AMT-600, made by TAYCA Corp., anatase crystal, average particle diameter 30 nm, specific surface area 50 m$^2$/g) and 20 ml of diethylene glycol monomethyl ether with a paint shaker for approximately 6 hours using glass beads.

The glass beads used to prepare the titanium oxide suspension are for uniformly dispersing titanium oxide particles in the suspension in the paint shaker, and have nothing to do with glass beads 9 to be described later.

Figure 5B:
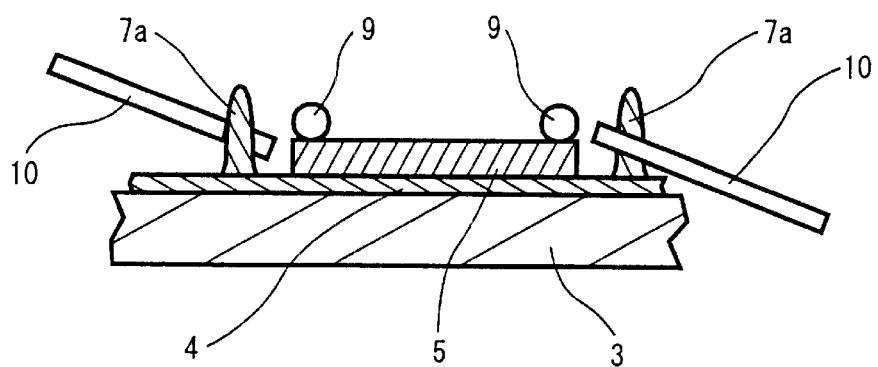

Then, as shown in FIG. 5b, a pasty glass frit 7a is coated on the conductive film 4 of the glass substrate 3, and glass tubes 10 each having a diameter of approximately 10 $\mu$m and a length of approximately 10 mm are placed in two positions to cross a portion on which the glass frit 7a is coated.

Glass beads 9 each having a diameter of 20 $\mu$m are placed on four corners of the semiconductor layer 5.

The pasty glass frit 7a has to be coated to a greater height than those of the semiconductor layer 5 and the glass bead 9.

The pasty glass frit 7a is obtained by dissolving approximately 50% by weight of a commercial glass powder (LS-2081, made by Nippon Electric Glass Co., Ltd.) and 5% by weight of an acrylic resin as a binder in α-terpineol.

When stickiness is poor in the coating, it is advisable to adjust the amount of the acrylic resin.

Figure 5C:
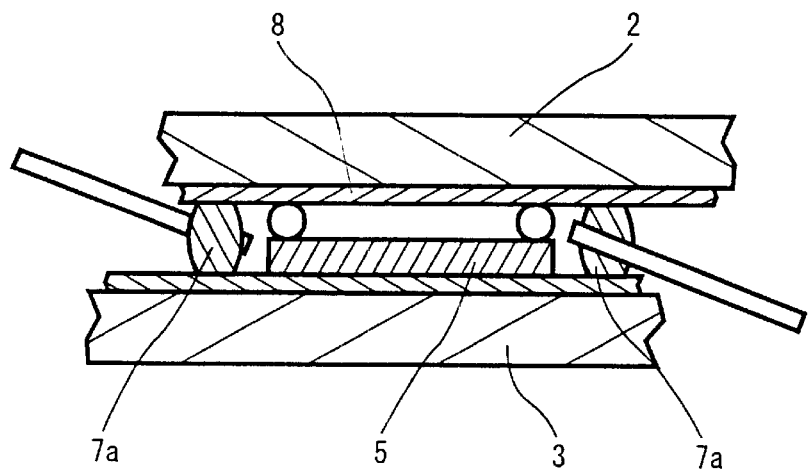

Thereafter, as shown in FIG. 5c, the conductive substrate 2 having the platinum film 8 approximately 1 $\mu$m in thickness on one surface is overlaid on the glass substrate 3.

At this time, the substrates have to be overlaid such that the semiconductor layer 5 of the glass substrate 3 is opposite to the platinum film 8 of the conductive substrate 2.

The conductive substrate 2 is made of a glass on which ITO is coated, and the platinum film 8 is formed by depositing platinum.

Subsequently, the pasty glass frit 7a is calcined and cured. In this case, the calcination is divided into temporal calcination and substantial calcination.

Figure 7:
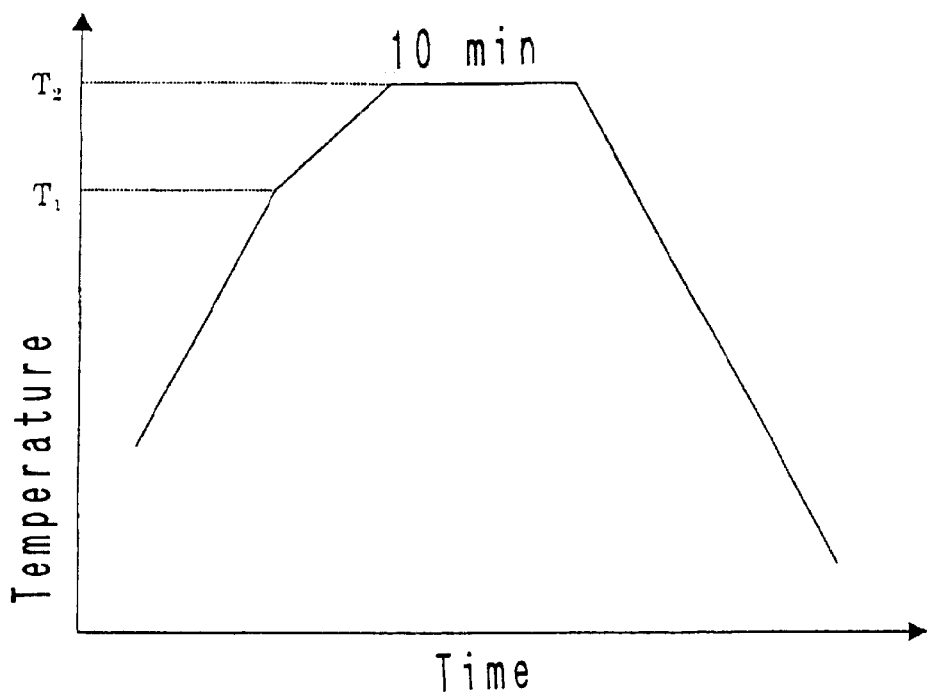
FIG. 7 is a graphical representation showing temperature characteristics in temporal calcination of a glass frit used in the dye-sensitizing solar cell of the invention.

The temporal calcination is conducted with a temperature profile shown in FIG. 7 that the temperature is raised to a temperature $T_1$ (approximately 320° C.) at a rate of approximately 7 to 10° C./min, the temperature $T_1$ is raised to a temperature $T_2$ (approximately 380° C.) at a rate of approximately 4° C./min, and the temperature $T_2$ is maintained for approximately 10 minutes and then lowered at a rate of approximately 5 to 100° C./min.

Figure 8:
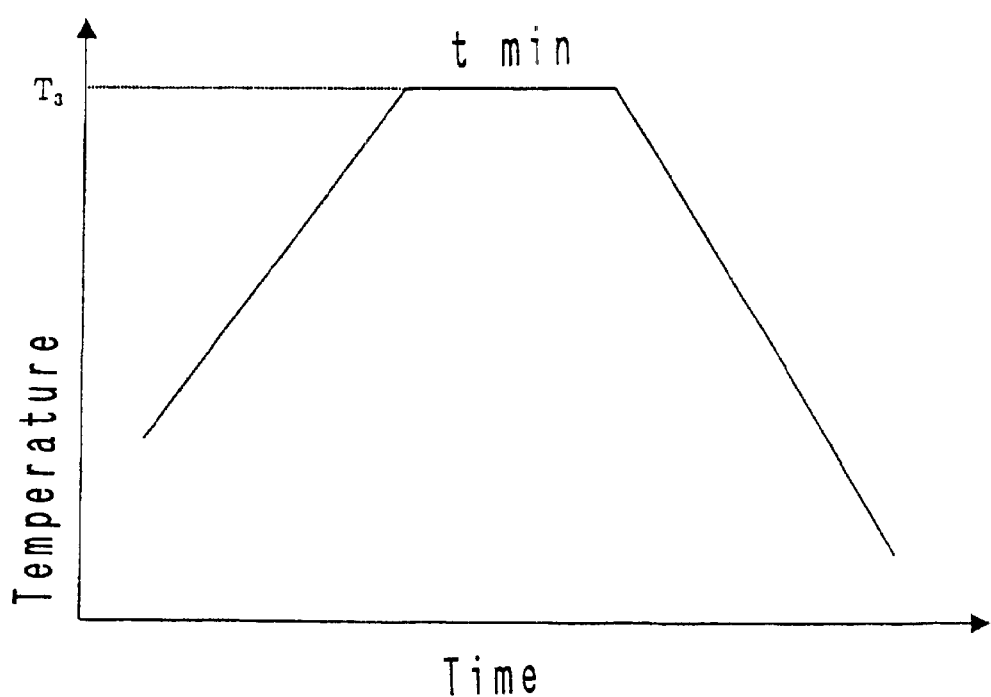
FIG. 8 is a graphical representation showing temperature characteristics in substantial calcination of a glass frit used in the dye-sensitizing solar cell of the invention.

The substantial calcination is conducted in the presence of oxygen with a temperature profile shown in FIG. 8 that the temperature is raised to a temperature $T_3$ (410° C.) at a rate of approximately 50° C./min, and the temperature $T_3$ is maintained for t minutes (approximately 10 minutes) and then lowered at a rate of approximately 20° C./min.

Figure 6D:
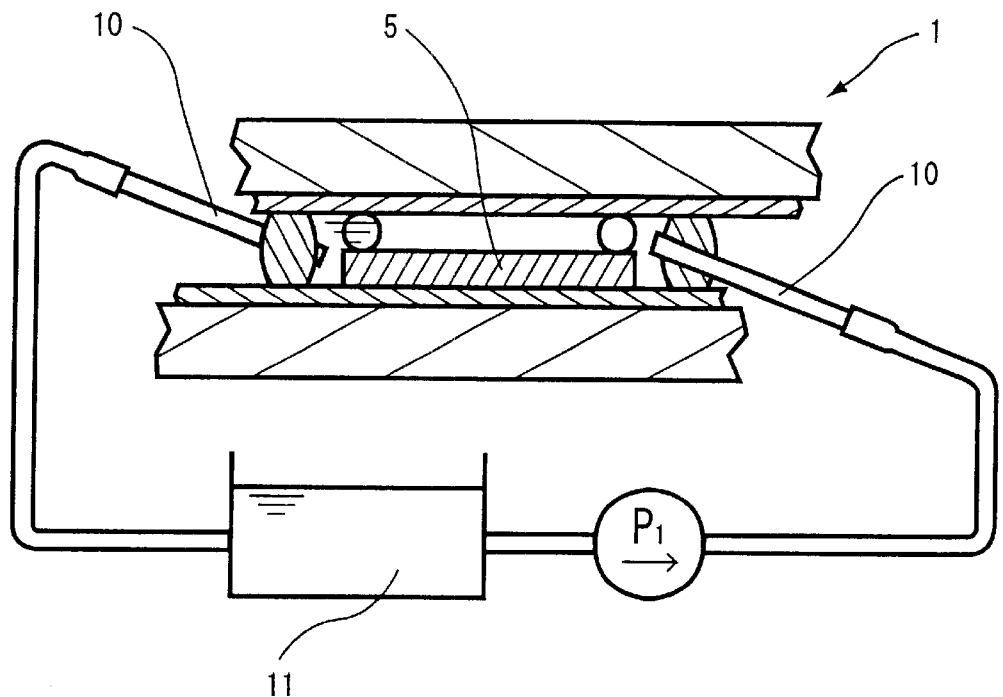
FIGS. 6d and 6e are flow charts describing a method for manufacturing the dye-sensitizing solar cell shown in FIGS. 1 to 4.

As shown in FIG. 6d, a pump $P_1$ is then connected with a glass tube 10 to circulate a dye solution 11 within the dye-sensitizing solar cell 1 for approximately 4 hours to adsorb the dye on the semiconductor layer 5.

Subsequently, the dye solution 11 is discharged through the glass tube 10, and it is washed several times with anhydrous ethanol, and then dried at approximately 60° C. for approximately 20 minutes.

As the dye solution 11, a solution obtained by dissolving a ruthenium dye (Ruthenium 535) made by Solarnix at a concentration of approximately $4 \times 10^{-4}$ mol/liter in anhydrous ethanol is used, and an injection amount of the pump $P_1$ is set at approximately 1 ml/min.

Figure 6E:
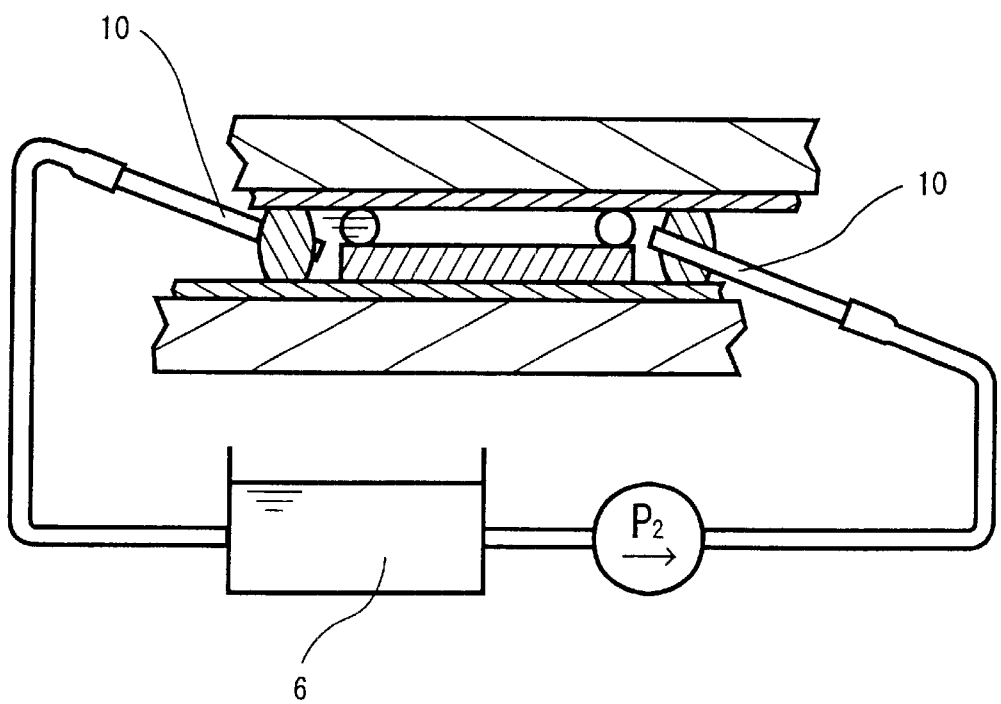

Then, as shown in FIG. 6e, the redox electrolyte 6 is injected with a pump $P_2$ via the glass tube 10, and the glass tube 10 is closed to complete the dye-sensitizing solar cell 1 shown in FIGS. 1 to 4.

In closing the glass tube 10, an inert gas such as nitrogen is charged into the glass tube 10 to be able to prevent the redox electrolyte 6 from being degraded by incorporating oxygen therein.

Example 2

Example 2 of the invention is described on the basis of FIGS. 9 to 12. The same numerals are allotted to the same members and positions as in Example 1.

Figure 9:
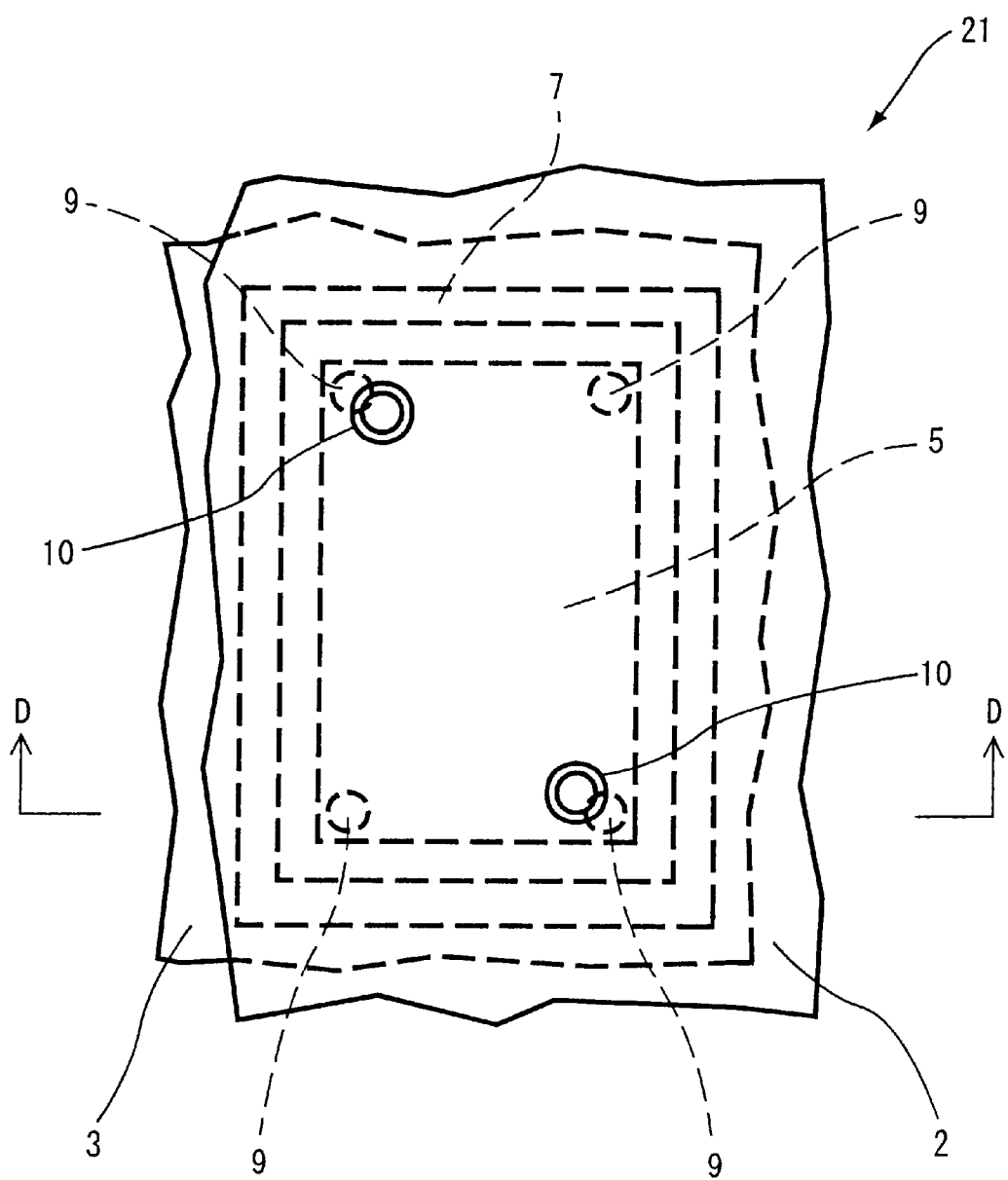
FIG. 9 is a plan view of a dye-sensitizing solar cell of the invention in Example 2.
Figure 10:
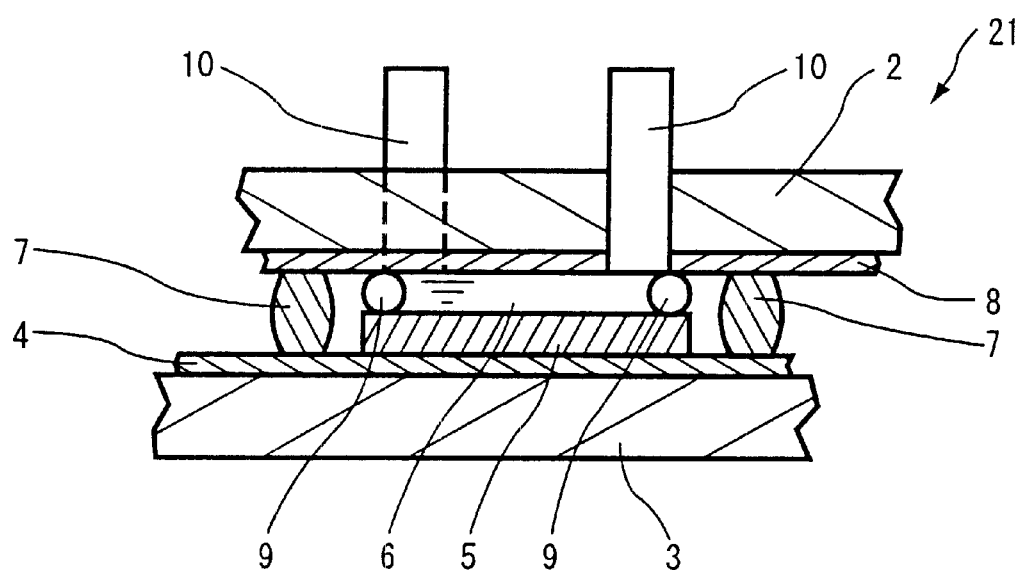
FIG. 10 is a sectional view taken along line D—D of FIG. 9.
Figure 11:
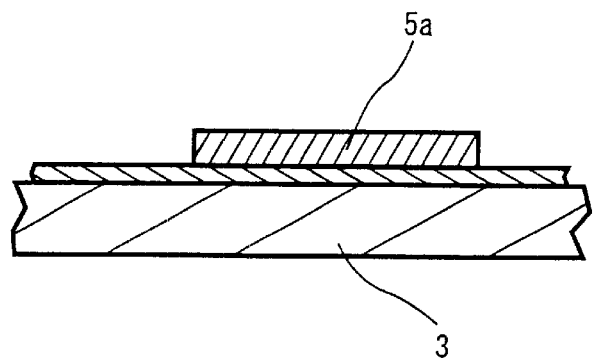
FIGS. 11a to 11c are flow charts describing a method for manufacturing the dye-sensitizing solar cell shown in FIGS. 9 and 10.
Figure 11:
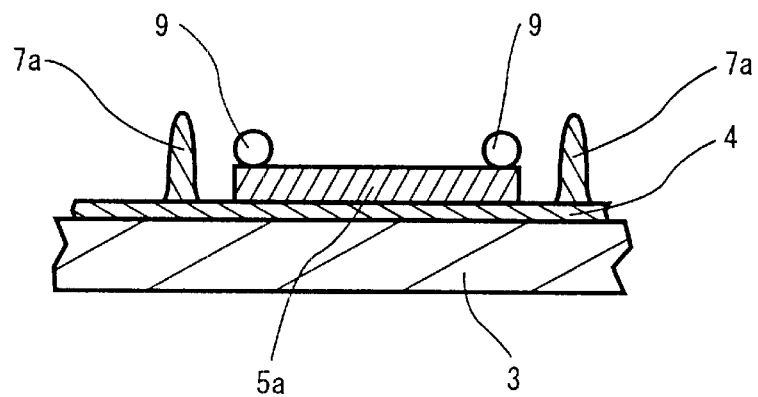
Figure 11:
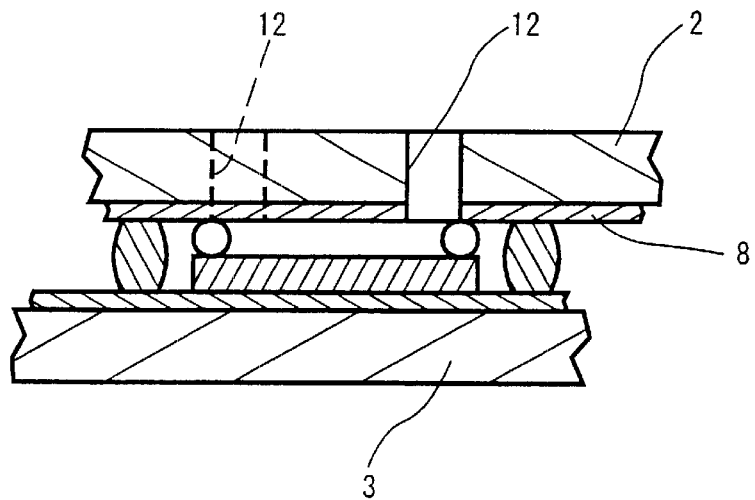

In a dye-sensitizing solar cell 21 shown in FIGS. 9 and 10, glass tubes 10 are arranged on a conductive substrate 2 by changing the positions of the glass tubes 10 in the dye-sensitizing solar cell 1 shown in FIGS. 1 to 4.

Further, the method for manufacturing the same is also changed, and the substantial calcination of the pasty glass frit 7a (after the temporal calcination) and the calcination of the suspension-coated layer 5a are simultaneously conducted as will be described later in detail.

In the method for manufacturing the dye-sensitizing solar cell shown in FIGS. 9 and 10, first, the same titanium oxide suspension as used in Example 1 is coated on a glass substrate 3 as shown in FIG. 11a to form a suspension-coated layer 5a, and the layer is predried at approximately 100° C. for approximately 30 minutes. At this stage, the calcination of the suspension-coated layer 5a is not yet conducted.

Then, as shown in FIG. 11b, the same pasty glass frit 7a as used in Example 1 is coated on a conductive film 4 of the glass substrate 3, and glass beads 9 are mounted on four corners of the predried suspension-coated layer 5a.

As shown in FIG. 11c, a conductive substrate 2 having a platinum film 8 on the opposite surface with openings 12 formed in two positions is then overlaid on the glass substrate 3.

Figure 12D:
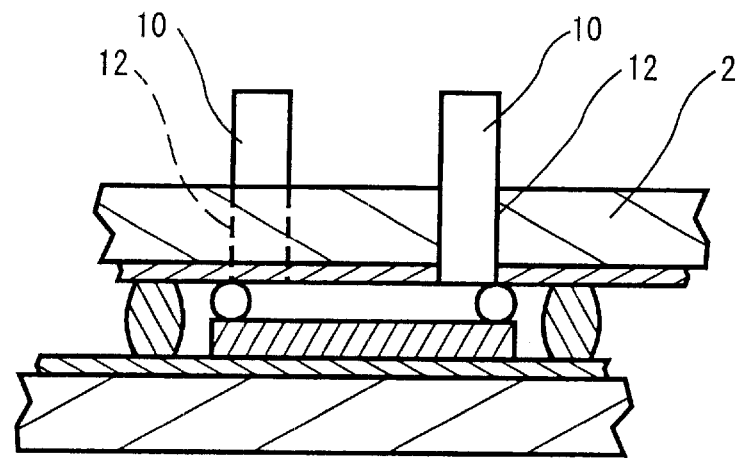
FIGS. 12d and 12e are flow charts describing a method for manufacturing the dye-sensitizing solar cell shown in FIGS. 9 and 10.

Subsequently, as shown in FIG. 12d, a pasty glass frit 7a (not shown) is coated on one or both of the openings 12 of the conductive substrate 2 and the glass tubes 10, and the glass tubes 10 are then inserted into the openings 12.

As the glass tube, a glass tube having a diameter of approximately 1 mm and a length of approximately 20 mm is used.

Thereafter, the temporal calcination of the pasty glass frit 7a is conducted as in Example 1.

Figure 12E:
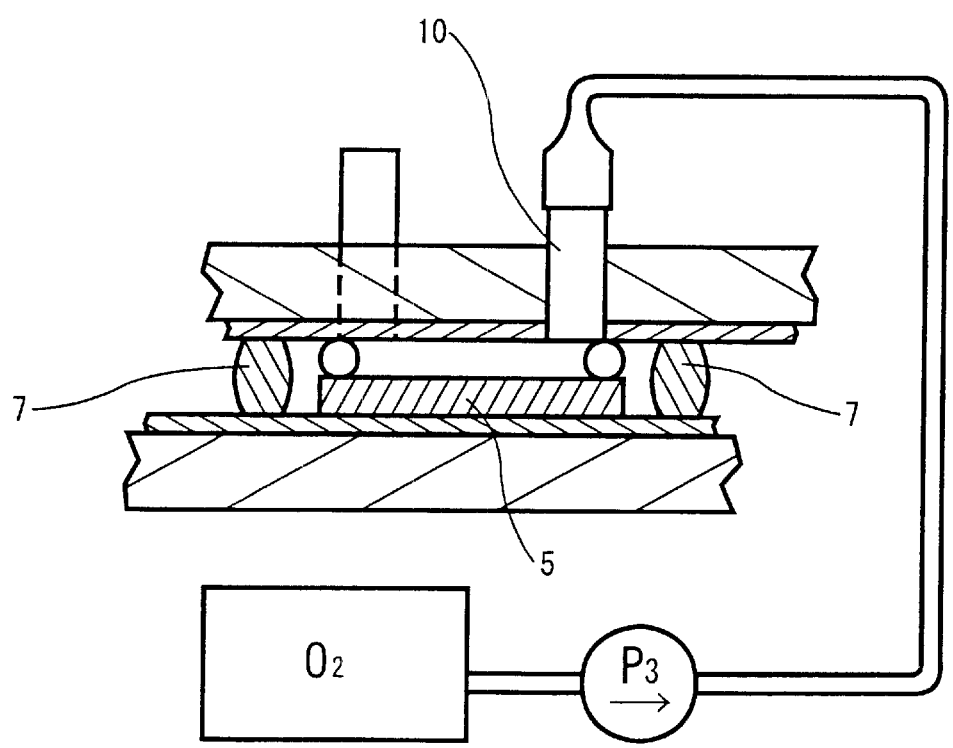

As shown in FIG. 12E, one of the glass tubes 10 is then connected with a pump $P_3$ for oxygen introduction. While feeding oxygen, the substantial calcination of the glass frit 7a and the calcination of the suspension-coated layer 5a are simultaneously conducted with a temperature profile that $T_3$ is approximately 460° C. and t is approximately 40 minutes as shown in FIG. 8.

Consequently, the cured glass frit 7 and the semiconductor layer 5 (FIGS. 9 to 10) are obtained.

Then, in the same manner as in Example 1, a dye is adsorbed on the semiconductor layer 5, and the redox electrolyte 6 is injected into the dye-sensitizing solar cell 21 to complete the dye-sensitizing solar cell shown in FIGS. 9 and 10.

Example 3

Figure 13:
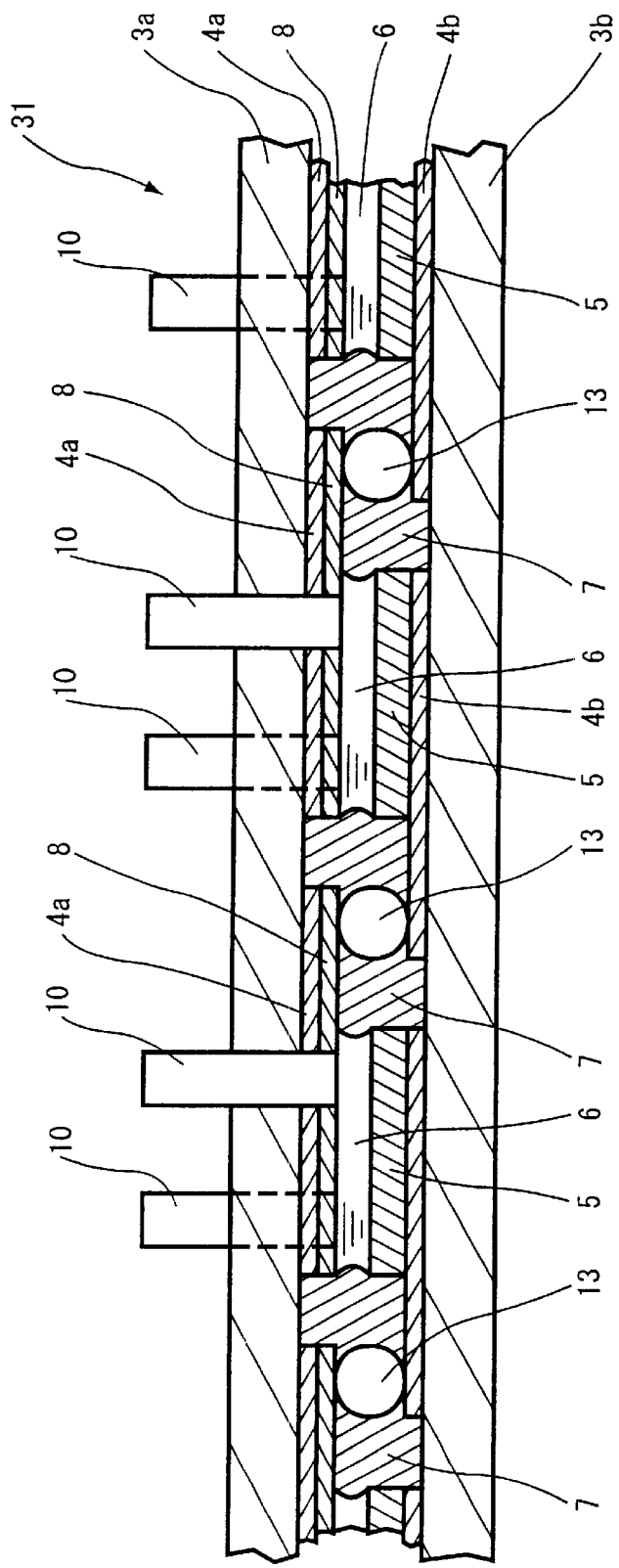
FIG. 13 is a sectional view showing a dye-sensitizing solar cell of the invention in Example 3.

Example 3 is described on the basis of FIGS. 13 to 15. The same numerals are allotted to the same members and positions as in Examples 1 and 2.

FIG. 13 is a sectional view of a module-type dye-sensitizing solar cell 31 in which a plurality of dye-sensitizing solar cells are provided on one and the same substrate and the adjacent dye-sensitizing solar cells are electrically connected to each other.

In the module-type dye-sensitizing solar cell 31 shown in FIG. 13, upper and lower substrates are formed of glass substrates 3a, 3b having conductive films 4a, 4b.

The adjacent dye-sensitizing solar cells are electrically connected to each other using a metal wire 13.

Figure 14A:
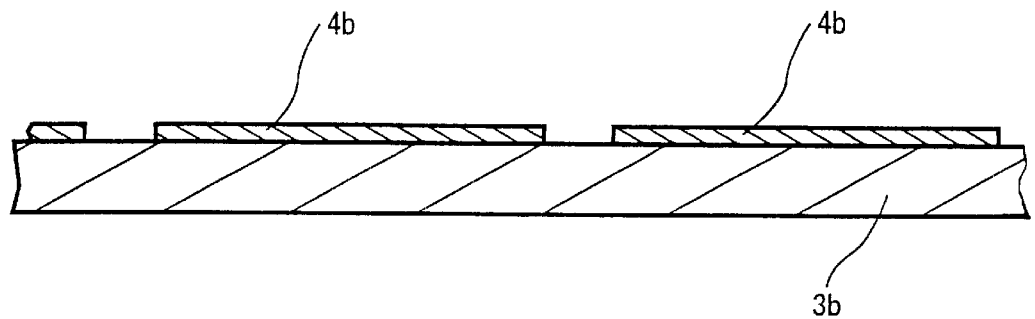
FIGS. 14a to 14c are flow charts describing a method for manufacturing the dye-sensitizing solar cell shown in FIG. 13.

In a method for manufacturing the module-type dye-sensitizing solar cell, first, plural conductive films 4b each having a width of approximately 10 mm is formed on the glass substrate 3b at intervals of approximately 100 μm as shown in FIG. 14a.

When the glass substrate 3b on which the conductive film 4b has been formed is used, the unnecessary portion of the conductive film 4b can be removed using an ND:YAG laser. This method is a technique which is well known in a method for manufacturing an amorphous silicon solar cell, and it can reduce an interval between conductive films to approximately 50 μm.

Figure 14B:
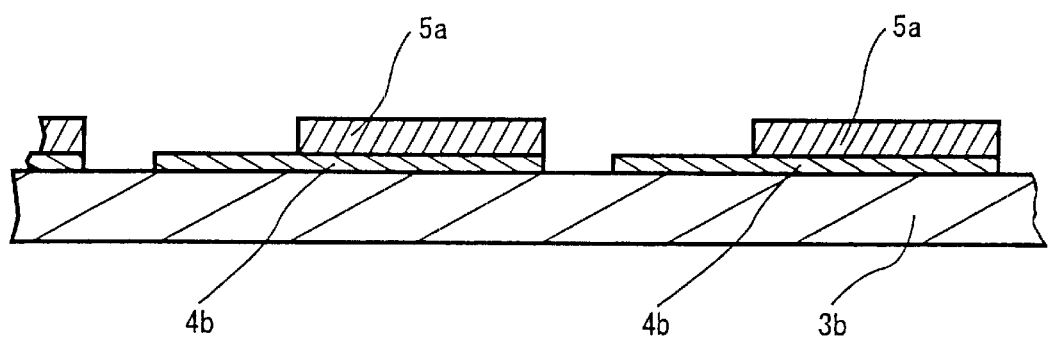

Then, as shown in FIG. 14b, the same titanium oxide suspension as used in Examples 1 and 2 is coated on the conductive film 4b of the glass substrate 3b to form a suspension-coated layer 5a.

At this time, the coating is conducted so that one end of the suspension-coated layer 5a is overlaid on one end of the conductive film 4b and the other end of the suspension-coated layer 5a leaves a space of approximately 115 μm from the other end of the conductive film 4b. It is advisable to conduct this coating by a screen printing method.

Thereafter, the predrying is conducted at approximately 100° C. for approximately 30 minutes.

Figure 14C:
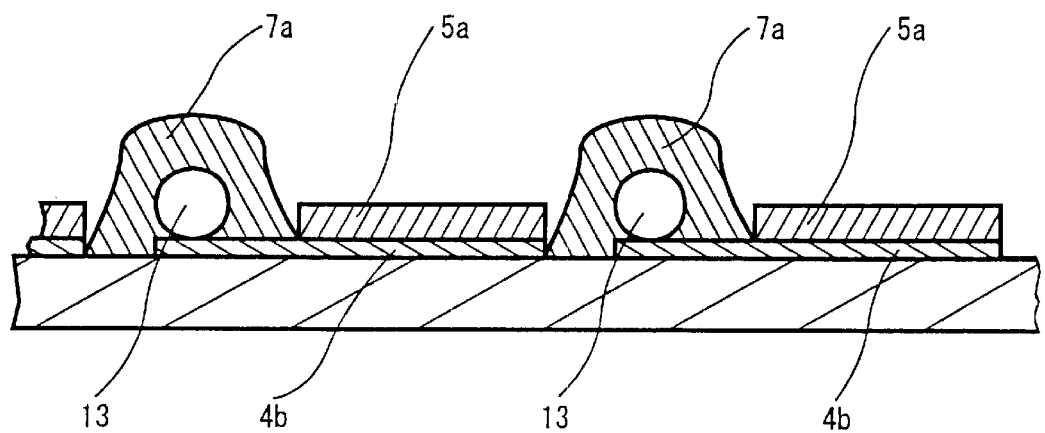

Then, as shown in FIG. 14c, a copper wire 13 having a diameter of approximately 15 μm is put on the conductive film 4b on which the suspension-coated layer 5a is absent, and the same pasty glass frit 7a as used in Examples 1 and 2 is coated on both sides of the metal wire 13.

At this time, care must be taken not to contact the metal wire 13 with the suspension-coated layer 5a.

Figure 15D:
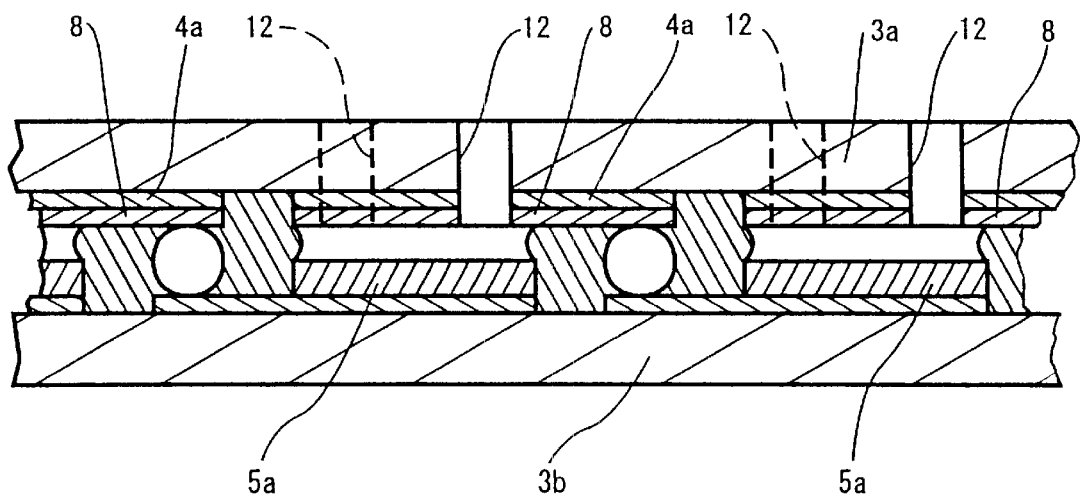
FIGS. 15d and 15e are flow charts describing a method for manufacturing the dye-sensitizing solar cell shown in FIG. 13.

Then, as shown in FIG. 15d, the glass substrates 3a, 3b are overlaid.

Laminates of a conductive film 4a and a platinum film 8 having a width of approximately 10 mm are formed on the opposite surface of the glass substrate 3a at intervals of approximately 100 μm, and two openings 12 are formed in every area of approximately 10 mm on which the conductive film 4a and the platinum film 8 are formed.

The laminate of the conductive film 4a and the platinum film 8 can easily be formed using the ND:YAG laser.

When the substrates are overlaid, care must be taken to oppose one suspension-coated layer 5a to one platinum layer 8 and not to oppose one suspension-coated layer 5a to two platinum layers 8.

Figure 15E:
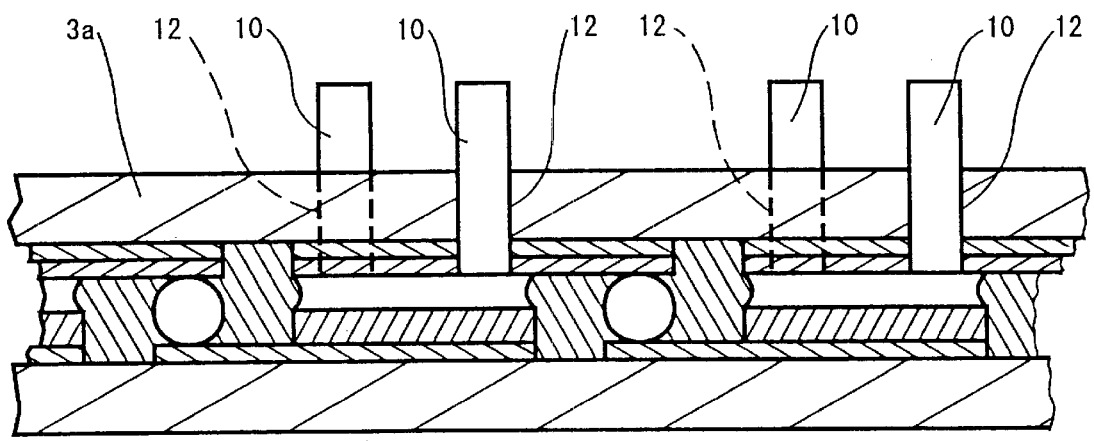

Thereafter, as shown in FIG. 15e, a pasty glass frit 7a (not shown) is coated on one or both of openings 12 of the glass substrate 3a and glass tubes 10, and the glass tubes 10 are then inserted into the openings 12.

Subsequently, the temporal calcination of the pasty glass frit 7a, the substantial calcination of the glass frit 7 and the calcination of the suspension-coated layer 5a are conducted as in Example 2, and the circulation of the dye solution 11 and the injection of the redox electrolyte 6 are conducted on each cell as in Example 1 to complete the module-type dye-sensitizing solar cell 31 shown in FIG. 13.

According to the invention, the dye-sensitizing solar cell excellent in durability and safety and the method for manufacturing the same can be provided by sealing the redox electrolyte with the glass frit. Further, the method for manufacturing the dye-sensitizing solar cell with the number of steps reduced can be provided by calcining and curing the glass frit and the suspension containing the semiconductor particles simultaneously.

Still further, the dye solution is circulated using the openings for communicating the closed space with the outside to adsorb the dye on the semiconductor layer, whereby the amount of the dye solution is reduced and the dye-sensitizing solar cell can be manufactured at lower costs.

Furthermore, the module can be provided using the metal wire, whereby the dye-sensitizing solar cell module having a broader light-receiving surface can be manufactured to increase an output.

What is claimed is:

1. A dye-sensitizing solar cell comprising:
    a first substrate, and a first conductive layer formed on the first substrate;
    a second substrate, and a second conductive layer formed on a surface of the second substrate, the second substrate being transparent, the first and second substrates being spaced by a distance with the first and second conductive layers on the first and second substrates, respectively, facing each other;
    a semiconductor layer having a dye adsorbed thereon, the semiconductor layer being formed on one of the conductive layers;
    a glass frit for sealing peripheral edges of the first and second substrates; and
    a redox electrolyte which is filled between the first and second substrates, wherein the redox electrolyte is formed so as to be provided between and directly contact each of (a) the semiconductor layer, and (b) the conductive layer formed on the substrate that the semiconductor layer is not formed on.

2. The solar cell of claim 1, in which the glass frit is a mixture of a glass powder and an acrylic resin.

3. The solar cell of claim 2, in which the glass powder is made of ceramics; PbO, $B_2O_3$, $Na_2O$, BaO, $SiO_2$ or a mixture thereof; or crystalline glass powders.

4. The solar cell of claim 1, in which the semiconductor layer is made of titanium oxide particles.

5. The solar cell of claim 1, in which the semiconductor layer has a width of 3 to 20 mm.

6. A method for manufacturing a dye-sensitizing solar cell, the method comprising:
    forming a semiconductor layer on a first or second substrate;
    opposing the first and second substrates to each other in spaced-apart relationship;
    sealing peripheral edges of the first and second substrates with a glass frit to form a closed space between the first and second substrates;
    forming openings for communicating the closed space with the outside in at least two positions;
    circulating a dye solution within the closed space through the openings so that the dye is adsorbed on the semiconductor layer; and
    discharging remaining dye solution and then injecting a redox electrolyte into the closed space.

7. The method of claim 6, in which the step of forming the semiconductor layer comprises coating a suspension containing semiconductor particles on a surface of the first or second substrate and calcining and curing the coated suspension, the step of sealing the peripheral edges of the first and second substrates comprises coating a pasty glass frit containing a binder on the peripheral edges of the first and second substrates, temporally calcining the pasty glass frit to remove the binder and then substantially calcining the glass frit to seal the peripheral edges of the first and second substrates, wherein the steps of calcining the suspension and substantially calcining the glass frit are conducted simultaneously.

8. The method of claim 7, in which the step of temporally calcining the glass frit is conducted under a temperature profile in which the temperature is raised to a first temperature with a first temperature gradient and raised from the first temperature to a second temperature with a second temperature gradient different than the first temperature gradient, and the second temperature is maintained for a period of time and then lowered with a third temperature gradient.

9. The method of claim 7, in which the step of calcining the suspension and substantially calcining the glass frit simultaneously is conducted under a temperature profile in which the temperature is raised to a third temperature with a fourth temperature gradient, and the third temperature is maintained for a period of time and then lowered with a fifth temperature gradient.

10. The method of claim 7, in which the suspension and the glass frit are calcined simultaneously with oxygen fed into the closed space via the openings.

11. The method of claim 6, in which the step of forming the openings for communicating the closed space with the outside is performed by forming openings in one of the first and second substrates.

12. The method of claim 6, in which the step of forming the openings for communicating the closed space with the outside is performed by inserting tubular members into the closed space through the glass frit.

13. A solar cell module comprising a plurality of dye-sensitizing solar cells arrayed in a plane and electrically connected with metal wires, each of the dye-sensitizing solar cells being defined in claim 1.

14. A method for manufacturing a dye-sensitizing solar cell, the method comprising:
    forming a semiconductor layer so as to be supported by a first substrate;
    opposing the first substrate to a second substrate in a spaced-apart relationship;
    sealing the first and second substrates with a seal in a manner so as to form a closed space between the first and second substrates;
    forming at least one opening for communicating the closed space with the outside;
    introducing a dye solution into the closed space through the opening so that the dye is adsorbed on the semiconductor layer; and
    discharging remaining dye solution from the closed space and thereafter injecting a redox electrolyte into the closed space.

15. The method of claim 14, wherein forming the semiconductor layer comprises coating a suspension containing semiconductor particles on a surface of the first or second substrate and calcining and curing the coated suspension, and sealing the first and second substrates comprises coating a pasty glass frit containing a binder on the peripheral edges of the first and second substrates, temporally calcining the pasty glass frit to remove the binder and then at least partially calcining the glass frit to be cured to form the seal.

16. The method of claim 15, wherein the steps of calcining the suspension and at least partially calcining the glass frit are conducted simultaneously.

17. The method of claim 14, where the seal comprises glass frit.

18. A dye-sensitizing solar cell comprising:
    a first substrate, and a first conductive layer formed on the first substrate;
    a second substrate, and a second conductive layer formed on a surface of the second substrate, one of the first and second substrates being transparent;

at least one spacer interposed between the first and second conductive layers whereby the first and second substrates are spaced by a distance with the first and second conductive layers facing each other;

a semiconductor layer having a dye adsorbed thereon, the semiconductor layer being formed on the first conductive layer;

a glass frit provided between the first and second conductive layers to surround the semiconductor layer and define a closed space between the semiconductor layer and the second conductive layer;

a redox electrolyte for filling up the closed space; and wherein the spacer is buried in the glass frit.

19. A solar cell module comprising a plurality of dye-sensitizing solar cells arrayed in a plane, wherein each solar cell includes the solar cell of claim 18, the spacer of each solar cell is conductive, and two solar cells adjacent to each other are electrically connected in series where the spacer is in contact with the first conductive layer of one solar cell and the second conductive layer of the other solar cell.

20. A method of manufacturing a solar cell module of claim 19, the method comprising:

forming a plurality of semiconductor layers on a first substrate having plural first conductive layers so that the semiconductor layers are arranged in spaced-apart relation with each other;

opposing, in spaced apart relation, the first substrate to a second substrate having plural second conductive layers;

surrounding each semiconductor layer with a conductive spacer and glass frit to define closed spaces between the semiconductor layers and the second substrate wherein each spacer is buried in the glass frit;

forming openings for communicating each closed space with the outside in at least two positions;

circulating a dye solution within each closed space through the openings so that the dye is adsorbed on each semiconductor layer; and discharging remaining dye solution and then injecting a redox electrolyte into each closed space.

* * * * *